United States Patent

Matsuda

[11] 3,798,664
[45] Mar. 19, 1974

[54] ELECTRICAL SHUTTER
[75] Inventor: Motonobu Matsuda, Sakai, Japan
[73] Assignee: Minolta Camera Kabushiki Kaisha, Osaka, Japan
[22] Filed: Oct. 6, 1972
[21] Appl. No.: 295,586

Related U.S. Application Data
[63] Continuation of Ser. No. 42,725, June 2, 1970, abandoned.

[30] Foreign Application Priority Data
June 10, 1969 Japan.............................. 44-45547

[52] U.S. Cl. .............................................. 95/10 CT
[51] Int. Cl. ................................................. G03b 7/08
[58] Field of Search.......... 95/10 CT, 53 EA, 53 EB

[56] References Cited
UNITED STATES PATENTS
3,324,779  6/1967  Nobusawa et al. ................. 95/10 X
3,500,729  3/1970  Rentschler et al...................... 95/10
3,511,143  5/1970  Rentschler............................. 95/10
3,535,989  10/1970 Kitai ..................................... 95/10

Primary Examiner—Samuel S. Matthews
Assistant Examiner—Michael L. Gellner
Attorney, Agent, or Firm—Watson, Cole, Grindle & Watson

[57] ABSTRACT

A shutter control device has two delay circuits and a timing circuit including a photoconductive element for determining a delay period as a function of the intensity of the scene light. The timing circuit and one of the delay circuits are actuated simultaneously with the operation of the shutter release and the other delay circuit is operated when the first actuated delay circuit attains a given potential. The shutter closing is initiated when the potentials of the two delay circuits are equal.

6 Claims, 7 Drawing Figures

ELECTRICAL SHUTTER

This is a continuation of application Ser. No. 42,725, filed June 2, 1970, now abandoned.

BACKGROUND OF THE INVENTION

A known electrical shutter for a TTL type camera with photometric means memorizes the output voltage of an electric delay circuit in accordance with the brightness of an object, and is controlled by the voltage. It is difficult to store the voltage with a sufficient degree of accuracy to a respond to wide range of object brightness without the use of complicated electrical and mechanical mechanisms which are disadvantageous in a single lens reflex camera of the TTL type.

SUMMARY OF THE INVENTION

The invention relates to, in a camera of the TTL photometric type, an electrical shutter comprising a photometric circuit with a photo-electric element and two timer circuits, wherein the photometric circuit and the first timer circuit are simultaneously actuated. The photometric circuit controls the actuation of the second timer circuit, and a switching circuit compares the output of the first timer circuit at the actuation of the opening/closing member of the shutter with the output of the second timer circuit. When both outputs coincide with each other, signals from the switching circuit start the closing action of the shutter opening/closing member.

The first object of the present invention is to provide, in a camera of the TTL photometric type, an electrical shutter which assures a high degree of photometric accuracy, covering wide ranges in brightness of objects.

The second object of the present invention is to provide, in a camera of the TTL photometric type, an electrical shutter which controls exposure so as to respond to brightness of an object detected prior to the shutter's action, without storage of the output voltage of the electric delay circuit responsive to the brightness of an object.

A feature of the present invention is an electrical shutter wherein a photometric circuit controls actuation of a second timer circuit in response to the brightness of an object detected immediately prior to the shutter's action. The opening action of the shutter is controlled by the output of a first timer circuit started simultaneously with the actuation of the photometric circuit, while the closing action of the shutter is started at the time when the output of the second timer circuit coincides with output of the first timer circuit.

Another feature of the invention is an electrical shutter wherein a photometric circuit controls the actuation of a second timer circuit in response to the brightness of an object, and the output of the first timer circuit is started simultaneously with the photometric circuit and controls the starting motion of the opening screen of a focal plain shutter. The output of the second timer circuit controls the starting motion of the closing screen of the focal plane shutter when it coincides with the output of the first timer circuit.

A further feature of the present invention is an electrical shutter wherein the photometric circuit controls the actuation of a second timer circuit in response to the brightness of an object and the output of a first timer circuit is started simultaneously with the photometric circuit to control the opening action of a mirror shutter. The output of the second timer circuit starts the closing action of the mirror shutter when it coincides with the output of the first timer circuit.

And yet another feature of the invention is an electrical shutter wherein the photometric circuit controls the actuation of a second timer circuit in response to the brightness of an object and the first timer circuit is started simultaneously with the photometric circuit to control the opening of the lens shutter blades. The output of the second timer circuit starts the closing of the lens shutter blades when it coincides with the output of the first timer circuit.

DESCRIPTION OF THE PREFERRED EMBODIMENT

Figure 1:
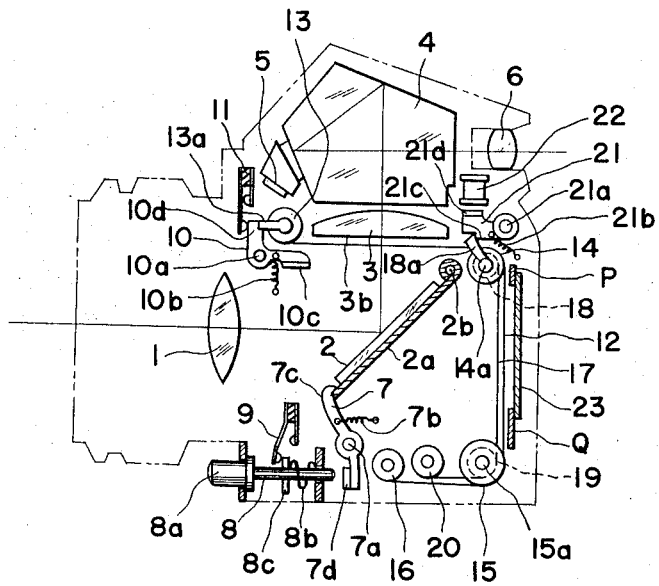
FIG. 1 is a sectional side view which illustrates the essential parts of the first embodiment in accordance with the present invention.
Figure 2:
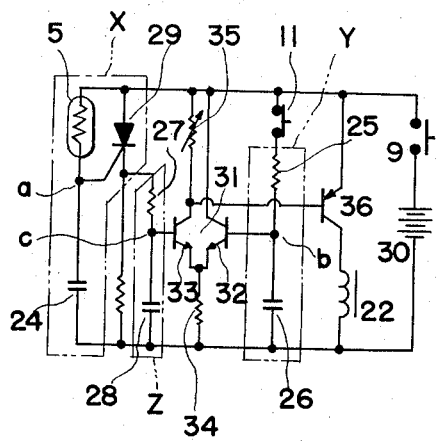
FIG. 2 is a circuit diagram of the electrical shutter control for the embodiment of FIG. 1.
Figure 3:
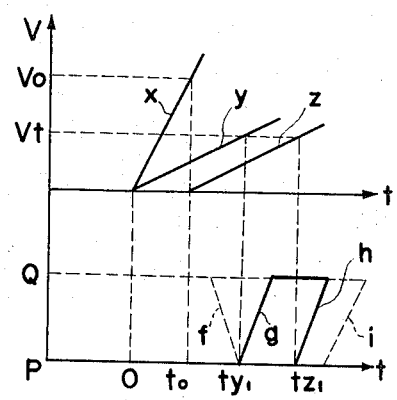
FIG. 3 is an explanatory graph which shows the action of an electrical shutter with respect to time.

Referring to FIGS. 1–3, the first embodiment of the invention comprises the following:

FIG. 1 shows a cocked focal plain shutter of the invention, wherein incoming rays of an object through sheet lens 1 are reflected by movable mirror 2 to form an image on a focusing surface on the under face of condenser lens 3. The light rays from the image are further reflected by penta-prism 4, a part of the rays striking photo-conductive element 5, while the remaining rays are directed towards finder eye-piece lens 6.

Opening screen 12 of focal plain shutter is wound on winding-up axle 13 and locking lug 13a is locked by opening screen locking lever 10 which will be described hereinafter. Closing screen 17 is wound on winding-up axle 18 and locking lug 18a is locked by closing screen locking lever 21 which will be described hereinafter. Opening screen 12 extends from its winding-up axle 13 over a deflecting roller 14 rotatably journaled on axis 14a between sections P and Q which makes an exposure window for photosensitive film 23, and then passes over another deflecting roller 15 rotatably journaled on axis 15a, and is wound on the opening screen winding-back axle 16 which is spring-loaded to rewind the opening screen. The closing screen 17 extends from its winding-up axle 18 over exposure window PQ of photosensitive film 23 and is led through a deflecting roller 19 which is coaxial with axle 15a, finally being wound on closing screen winding-back axle 20.

The movable mirror 2 is supported by a movable frame 2a pivoted at axis 2b and having a clockwise rotating tendency due to a spring (not shown), while movable frame 2a is locked at an oblique position of 45° with the focal axis of object lens 1 by a locking pawl 7c which restrain its rotating tendency and is formed on one arm of the mirror locking lever 7 pivoted at axis 7a and having a clockwise rotating tendency due to a spring 7b.

Contacting plane 7d formed on the other arm of mirror locking lever 7 faces the end of releasing rod 8 with release button 8a which is projected outwardly from the camera by spring 8b.

A collar 8c formed on releasing rod 8 engages with a movable contact strip of power switch 9 having a normal closing tendency, and keeps open power switch 9 against its closing tendency.

By pressing the release button 8a positioned as shown in FIG. 1, power switch 9 is first closed, and by pressing it further, the releasing rod 8 swings the mirror locking lever 7 counterclockwise against its spring 7b, thereby unlocking its pawls 7c from the movable frame 2a, allowing it to jump up to its raised position.

The front screen locking lever 10 is pivoted at axis 10a and has a clockwise rotating tendency due to spring 10b, comprises contacting plate 10c on one arm which may be struck by movable frame 2a, and a locking pawl 10d on the other arm which may be interlocked by locking lug 13a on front screen winding-up axle 13. Accordingly, when the contacting plate 10c is pressed upwardly due to the jumping-up motion of movable frame 2a, the front screen locking lever 10 swings counterclockwise against spring 10b, and unlocks locking pawl 10d from locking lug 13a, allowing the opening screen 12 to start moving by the winding force of winding-back axle 16.

Simultaneously with the closure of power switch 9, the electrical shutter control circuit, which is described hereinafter, is actuated, but electro-magnetic coil 22 will be activated after the elapse of a predetermined time.

The closing screen locking lever 21 is pivoted at axis 21a and has a counterclockwise rotating tendency due to spring 21b, and its locking step 21c engages with a locking lug 18a on closing screen winding-up axle 18. Armature 21d faces electromagnetic coil 22 across an air gap between them; and closing screen locking lever 21, when electromagnetic coil 22 is actuated, rotates clockwise against the spring 21b, thereby unlocking locking step 21c from the locking lug 18a, and allowing closing screen 17 also to start its movement towards winding-back axle 20.

The opening screen locking lever 10 is engaged with a movable contact strip of switch 11 which has a normal closing tendency but is opened by the action of opening screen locking lever 10.

In FIG. 2, power source 30 is connected to power switch 9, also, connected to these and to each other in parallel are a photometric circuit X, a first timer circuit Y, a second timer circuit Z controlled by said photometric circuit X, switching circuit 31 actuated by the outputs of both timer circuits YZ, and a driving circuit for electromagnet coil 22 controlled by the output of switching circuit 31.

The first timer circuit Y is connected to power switch 9 and power source 30 via switch 11, and comprises a combination of a constant resistance 25 and a condenser 26 connected in series to each other, and an output is taken at connecting point b to the input of switching circuit 31.

The switching circuit 31 comprises two transistors 32 and 33 with the output at point b of the first timer circuit Y connected to the base of the transistor 32. The output at point c of the second timer circuit Z is connected to the base of the transistor 33, and the emitters of both transistors 32 and 33 are connected to the negative side of power source 30 via common resistance 34. The collector of transistor 33 is connected to the positive side of power source 30 via an adjustable resistance 35, the collector of transistor 32 is connected to the base of transistor 36.

Referring now to FIG. 1 in which the shutter is in a cocked condition, if release button 8c is pressed, the power switch 9 is closed at point 0 of its initial stroke as shown in FIG. 3, thereby condenser 24 of the photometric circuit X starts charging with current flowing through photo-conductive element 5 in response to the brightness of an object, as shown by curve x, the slope of which varies in accordance with the brightness of the object.

The first timer circuit Y also starts its operation via switch 11 which has been closed at the same time that the photometric circuit was actuated, thereby its condenser 26 is charged by current flowing through the constant resistance 25, as shown by curve y. SCR 29 becomes conductive when the charged voltage, namely voltage at point a, of the condenser 24 reaches predetermined voltage Vo.

Denoting that instant as $t_0$, the second timer circuit Z is simultaneously actuated, and condenser 28 starts to charge. Because both resistances 25 and 27 which constitute delay elements of both timer circuits Y and Z, and both condensers 26 and 27 are respectively of same value, the charging curves y, z of both condensers 26, 28 are parallel to each other and the delay times of circuits Y and Z are equal.

When the release button 8a is pressed further, the mirror locking lever 7 is swung by the releasing rod 8, thereby releasing the locked movable frame 2a which jumps up and uncovers the exposure window from its Q-side to P-side as shown by the broken line in FIG. 3, and frame 2a, at the finish of its motion, strikes the front screen locking lever 10 to rotate it counterclockwise and to unlock the front screen winding-up axle 13, allowing the front screen 12 to start its movement at the time $t_{y_1}$, and switch 11 to open at the same time; thus the charging of condenser 26 is finished, generating on resistance 34 by transistor 32 a bias voltage corresponding to the charged voltage $V_t$ of condenser 26 at the time $t_{y_1}$.

When a time equal to the time difference between 0 and $t_0$ has passed and after the time $t_{y_1}$, the voltage of condenser 28 of the second timer circuit Z reaches $V_t$, causing the transistor 33 to be actuated, the transister 36 becomes conductive, and exciting current flows through the electromagnetic coil 22, and thereby electromagnetic coil 22 rotates the rear screen locking lever 31, allowing the closing screen 17 to travel and completing the exposing operation.

Accordingly, the exposing time coincides with $t_{z_1} - t_{y_1}$, this length of time being equal to the time $t_0 - $ This 0. means the exposing time is controlled by the photometric circuit X in response to the brightness of the object. Further, the broken line i indicates the return of the mirror to the 45° oblique position after the completion of exposure by means of any known quick return mechanism not shown.

Figure 4:
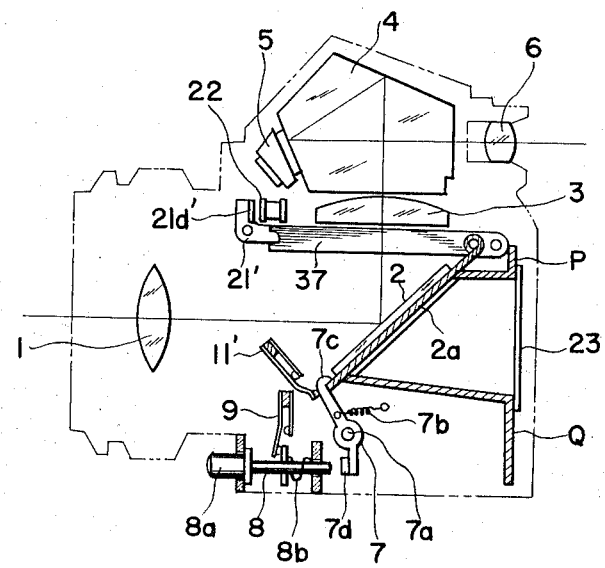
FIG. 4 is a sectional side view which illustrates the essential parts of second embodiment in accordance with the present invention.

The second embodiment shown in FIG. 4 is that of a camera provided with a mirror shutter.

In the mirror shutter, an opening action for the exposure window of the mirror, which is shown by line $f$ in FIG. 3, and therefore the opening switch 11' of the first timer circuit is arranged to be connected with the power source connected to mirror locking lever 7, as shown in FIG. 4. In addition, the return frame 37 supporting the movable mirror frame 2a and having a counterclockwise rotating tendency is locked by a return frame locking lever 21' of which armature 21'd is operated by an electromagnetic coil 22.

Figure 5:
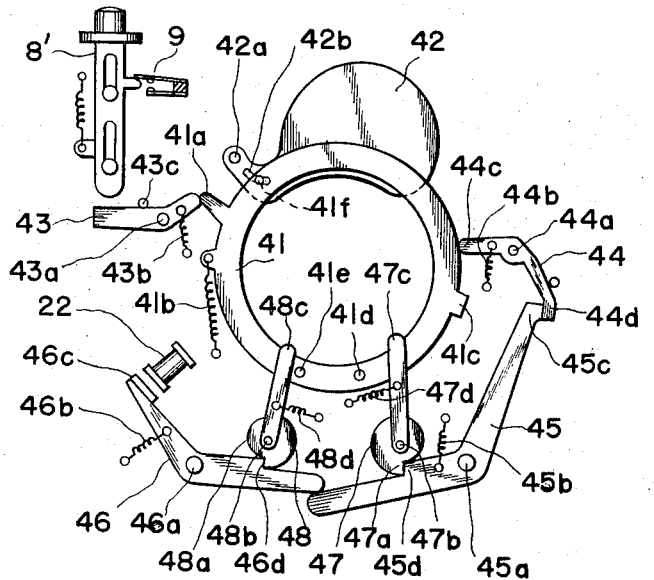
FIG. 5 is a front view showing the essential parts of the shutter mechanism of a third embodiment in accordance with the present invention.

FIG. 5 is the third embodiment of the invention showing a camera provided with a mirror lens, wherein shutter blade 42, only one being shown for the purposes of this description, is rotatably journaled on its axis 42a to a base plate not shown, and driving pin 41f of sector ring 41 is inserted in a slot 42b therein. The sector ring 41 has a counterclockwise rotating tendency because of spring 41b, its locking arm 41a is locked by releasing lever 43 which is rotatably pivoted to axis 43a and has a clockwise rotating tendency by a spring 43b, and contacts a stop pin 43c in the condition as shown in the drawing, wherein the shutter is charged and its blade is opened to illuminate the photoconductive element. Releasing lever 43 is arranged with releasing rod 8' which closes switch 9 by its initial stroke, and rotates releasing lever 43 counterclockwise against the spring 43b by its final stroke, thus releasing locking arm 41a from its locked condition.

Said sector ring 41 has an activating lug 41c on its periphery, an opening driven pin 41d, a closing driven pin 41e and drive pin 41f. An opening release lever 44 pivoted on axle 44a has a counterclockwise rotating tendency due to a spring 44b, one arm 44c of release lever 44 lies in the counterclockwise rotating locus of activating projection 41c, and the other arm 44d is engaged with one end 45c of the opening locking lever 45. Said opening locking lever 45 is journaled on axis 45a and has a clockwise rotating tendency by a spring 45b and is locked to a locking step 45d thereon by a locking cam 47a of an opening drive member 47 of which a drive arm 47c equipped with a spring 47d, lies in the rotating locus of an opening driven pin 41d. Further, a closing locking lever 47 is journaled on axis 47 and has a counterclockwise rotating tendency by a spring 46b is provided with a locking step 46d formed on its one arm, and on the other arm with an armature which faces electromagnetic coil 22 of the electrical control circuit. A closing drive member 48 is locked to locking step 46d by its locking cam 48a journaled on axis 48b, and a drive arm 48c thereof equipped with a spring 48d lies in the rotating locus of a closing driven pin 41e.

The composition of the controlling circuit for these devices is just the same as shown in FIG. 2.

In FIG. 5, if the release rod 8' is pressed, the power switch 9 is first closed, actuating the photometric circuit X and the first timer circuit Y. At the time $t_0$, in the same way as that of the first embodiment, when a delay time calculated by the photometric circuit X has expired, SCR 29 will be actuated, thus activating the second timer circuit Z.

If the release rod 8' is pressed further, the releasing lever 43 swings counterclockwise, unlocking the locking arm 41a, thereby the sector ring 41 rotates counterclockwise, shutting the shutter blade 42, and the actuating lug 41c engages with the opening releasing lever 44 and rotates it clockwise, lever 44 rotates a mirror (not shown) by means of any known mechanism and opens the switch 11 located as shown in FIG. 2, and thereby stops the charging of the condenser 26 of the first timer circuit Y. Furthermore, lever 44 simultaneously rotates the opening locking lever 45 counterclockwise, thereby the opening drive member 47 pushes back the opening drive pin 41d clockwise allowing blade 42 to reopen for an exposure. Those skilled in the art will recognize that switch 11 may be mounted to be operative in the structure of FIG. 5, especially in view of the fact that it is illustrated in operative relationship in FIG. 2.

When the delay time of photometric circuit X has passed after the time $t_{y1}$ the charging voltage of the condenser 28 of the second timer circuit Z becomes equal to the charged voltage of the condenser 26 of the first timer circuit, and switching circuit 31 actuates the transistor 36 to make it conductive and to excite the electromagnetic coil 22, thereby the closing locking lever 46 swings clockwise, allowing the closing drive member 48 to release its locking and the drive arm 48c thereon to rotate the closing driven pin 41e counterclockwise, and thereby the shutter blade 42 is closed.

In each of embodiments aforementioned, if the release rod should start mechanically to activate the shutter before condenser 24 has not yet been charged up to a predetermined voltage, then it would be impossible to expect an accurate exposure.

Where objects are of usual brightness, such a condition as described above cannot occur because the length of time $0 - t_0$ is extremely short, but in the case of a dark object, such malfunction may arise.

Figure 6:
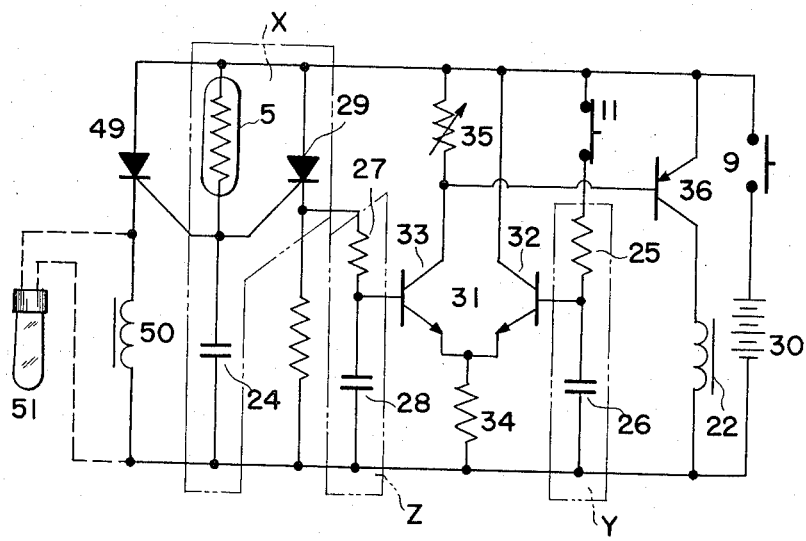
FIG. 6 is a circuit diagram of another embodiment of an electrical shutter control in accordance with the present invention.

The circuit as shown in FIG. 6 is intended to prevent such a malfunction, wherein a power source 30 and a power switch 9 are provided along with a photometric circuit X, the first timer circuit Y, the second timer circuit Z, a switching circuit 31 and a driving circuit for electromagnetic coil 22, all of these circuits being equivalent to those shown in FIG. 2. SCR49 and an electromagnet coil 50 which are connected in series to each other, and the gate of said SCR49 is connected to point a of the photo-electric element 5 of the photometric circuit and the condenser 24, in the same way as SCR29 of the photometric circuit X.

Figure 7:
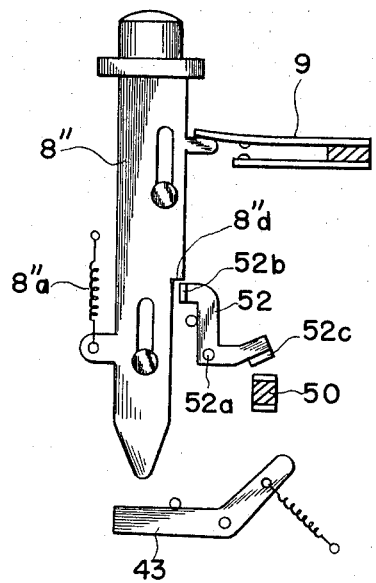
FIG. 7 is an enlarged side view showing construction of the essential parts of a release holding mechanism.

Furthermore, electromagnetic coil 50, as shown in FIG. 7, faces armature 52c on one arm of a releasing holding lever 52 which is rotatably journaled on its axis 52a, and a holding arm 52b thereof holds a releasing rod 8'' within its travelling path through which rod 8'' has an ascending tendency due to a spring 8a''.

Accordingly, the descending motion of the releasing rod 8'' is temporarily held until the condenser 24 has been completely charged up to a predetermined voltage $V_o$ and the second timer circuit Z is actuated, and the electromagnetic coil 50 is energized to release lever 52, allowing the releasing rod 8'' to descend, thus the mirror locking lever in FIG. 1 or the releasing lever 43 in FIG. 5 is allowed to freely operate.

In addition, by connecting a pilot lamp 51 in parallel with electromagnetic coil 50 as shown by the broken line in FIG. 6 may be provided within the finder, thereby indicating the release of lever 50.

I claim:

1. A shutter control device for a photographic camera having a shutter release mechanism, a shutter opening mechanism, a shutter closing mechanism and a photoconductive element normally exposed to scene light through an objective lens of the camera and unexposed to the light while said shutter mechanisms are operative, comprising:
   a first timer circuit and a second timer circuit for respectively storing first and second signals varying as the same function of time;
   a photomertric circuit including said photoconductive element for actuating said second timer circuit after a delay period determined as a function of the intensity of the scene light;
   said photometric circuit and said first timer circuit are actuated simultaneously by operation of said shutter release mechanism;
   a switch for deactuating said first timer circuit in response to actuation of said shutter opening mechanism for producing said first signal;
   means for actuating said shutter closing member; and
   a control circuit responsive to said first and second signals for energizing said means for actuating said shutter closing member at the instant when said first signal is substantially equal to said second signal.

2. A shutter control device as in claim 1, wherein said shutter release mechanism comprises a manually operable release member movable to a first and a second position for actuating said photometric circuit and said first timer circuit in said first position and actuating said shutter opening member in said second position.

3. A shutter control device as in claim 2, further comprising a locking means for preventing said release member from actuating said shutter opening mechanism until said second timer circuit is actuated.

4. A shutter control device as in claim 3, wherein said locking means comprises:
   means for stopping said release member in said first position;
   means for releasing said means for stopping; and
   switching means connected to said photometric circuit for actuating said means for releasing after the delay period of said photometric circuit.

5. A shutter control device as in claim 1, further comprising a power source and wherein said photometric circuit includes a capacitance connected in series with said photoconductive element and a second switch connected to the junction between said photoconductive element and said capacitance, said second switch is responsive to a predetermined voltage stored by said capacitance;
   said second timer circuit is connected to said power source via said second switch;
   said control circuit includes a differential amplifier having two input terminals respectively connected to said first timer circuit and said second timer circuit;
   said first and second timer circuits each comprise a series connected resistance and capacitance and the respective resistance and capacitance of said first and second timer circuits are substantially equal; and
   said means for actuating said shutter closing member includes additional switching means triggered by said differential amplifier.

6. A shutter control device as in claim 5, further comprising an indicating member and a third switch connected to the junction between said photoconductive element and said capacitance for energizing said indicating member with said condenser charged to said predetermined voltage.

* * * * *